United States Patent
Kudo (10) Patent No.: US 9,124,759 B2
(45) Date of Patent: Sep. 1, 2015

(54) REPRODUCTION APPARATUS

(75) Inventor: Toshimichi Kudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/112,145

(22) Filed: May 20, 2011

(65) Prior Publication Data

US 2011/0293245 A1    Dec. 1, 2011

(30) Foreign Application Priority Data

May 26, 2010  (JP) ................................ 2010-120744

(51) Int. Cl.
| | |
|---|---|
| H04N 5/783 | (2006.01) |
| H04N 5/14 | (2006.01) |
| G11B 27/034 | (2006.01) |
| G11B 27/10 | (2006.01) |
| G11B 27/28 | (2006.01) |
| G11B 27/32 | (2006.01) |
| H04N 9/87 | (2006.01) |
| H04N 21/8549 | (2011.01) |

(52) U.S. Cl.
CPC .............. *H04N 5/147* (2013.01); *G11B 27/034* (2013.01); *G11B 27/105* (2013.01); *G11B 27/28* (2013.01); *G11B 27/322* (2013.01); *H04N 5/783* (2013.01); *H04N 9/8715* (2013.01); *H04N 21/8549* (2013.01)

(58) Field of Classification Search
USPC ................... 386/239, 241, 243, 251, 230, 343
See application file for complete search history.

(56) References Cited

U.S. PATENT DOCUMENTS

| | | | | |
|---|---|---|---|---|
| 2004/0197088 | A1* | 10/2004 | Ferman et al. | 386/117 |
| 2004/0218904 | A1* | 11/2004 | Yoon et al. | 386/69 |
| 2006/0188217 | A1* | 8/2006 | Iwabuchi et al. | 386/68 |
| 2007/0003212 | A1* | 1/2007 | Shiiyama | 386/46 |
| 2007/0047917 | A1* | 3/2007 | Sasaki et al. | 386/96 |
| 2008/0037950 | A1* | 2/2008 | Ono et al. | 386/68 |
| 2009/0060471 | A1* | 3/2009 | Park et al. | 386/124 |
| 2012/0133791 | A1* | 5/2012 | Tokuyama | 348/222.1 |

FOREIGN PATENT DOCUMENTS

| | | | |
|---|---|---|---|
| JP | 2005-025894 A | 1/2005 |
| JP | 2007-067592 A | 3/2007 |
| JP | 2007-288300 A | 11/2007 |
| JP | 2008-193270 A | 8/2008 |
| JP | 2008-306311 A | 12/2008 |

* cited by examiner

*Primary Examiner* — Thai Tran
*Assistant Examiner* — Mishawn Dunn
(74) *Attorney, Agent, or Firm* — Canon USA Inc IP Division (57) ABSTRACT

A reproduction apparatus includes a reproduction unit configured to reproduce a moving image signal from a recording medium, a reception unit configured to receive an instruction for switching between a normal reproduction mode and a highlight reproduction mode for reproducing a plurality of highlight reproduction periods in the moving image signal recorded in the recording medium, and a control unit configured to determine a reproduction start position of the moving image signal in response to the reception of the instruction for switching to the normal reproduction mode during reproduction of the moving image signal in the highlight reproduction mode, and control the reproduction unit to reproduce the moving image signal in the normal reproduction mode from the determined reproduction start position. The control unit determines a head position for the highlight reproduction period which includes a reproduction position of the moving image signal when the switching to the normal reproduction mode is instructed, as the reproduction start position.

17 Claims, 10 Drawing Sheets

| HIGHLIGHT PORTION ID | SCENE NO. | CUT NO. | START TIME | LENGTH |
|---|---|---|---|---|
| 1 | 1 | 1 | 00:00:10:00 | 00:00:40:00 |
| 2 | 1 | 2 | 00:03:20:00 | 00:00:50:00 |
| 3 | 2 | 1 | 00:02:00:00 | 00:00:40:00 |
| 4 | 3 | 1 | 00:00:10:00 | 00:00:30:00 |
| 5 | 4 | 1 | 00:00:12:00 | 00:00:25:00 |
| 6 | 6 | 1 | 00:00:30:00 | 00:00:42:00 |
| 7 | 6 | 2 | 00:03:10:00 | 00:00:40:00 |

REPRODUCTION APPARATUS

BACKGROUND OF THE INVENTION

1. Field of the Invention

The present invention relates to a reproduction apparatus, and more particularly, to highlight reproduction of a moving image.

2. Description of the Related Art

Conventionally, recording apparatuses, such as hard disk drive (HDD) recorders for recording TV broadcasting are well known. Among the recorders, a recorder has a function for partly reproducing a moving image or sound in a recorded broadcasting program, as a digest (highlight) (refer to, e.g., Japanese Patent Application Laid-Open No. 2008-306311).

A conventional video camera is known, which shoots an image of an object and records a moving image or sound of the object. Recently, a home video camera appears to record the moving image or sound in a recording medium with a large capacity capable of random access, e.g., a memory card or HDD, and is in widespread use in a typical household.

In the conventional highlight reproduction, a part of the recorded moving image or sound is selected and reproduced. Therefore, when a user wants to view all moving images during reproducing the highlight, the highlight reproduction needs to suspend and an instruction for normal reproduction needs to be given.

After the user switches the highlight reproduction to the normal reproduction, he/she needs to search for a desired reproduction position. It is greatly troublesome.

SUMMARY OF THE INVENTION

The present invention is directed to provide an apparatus capable of switching highlight reproduction to normal reproduction with a simple configuration according to the present invention.

Further, the present invention is directed to provide an apparatus capable of automatically resuming the normal reproduction from a proper position when switching the highlight reproduction to the normal reproduction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
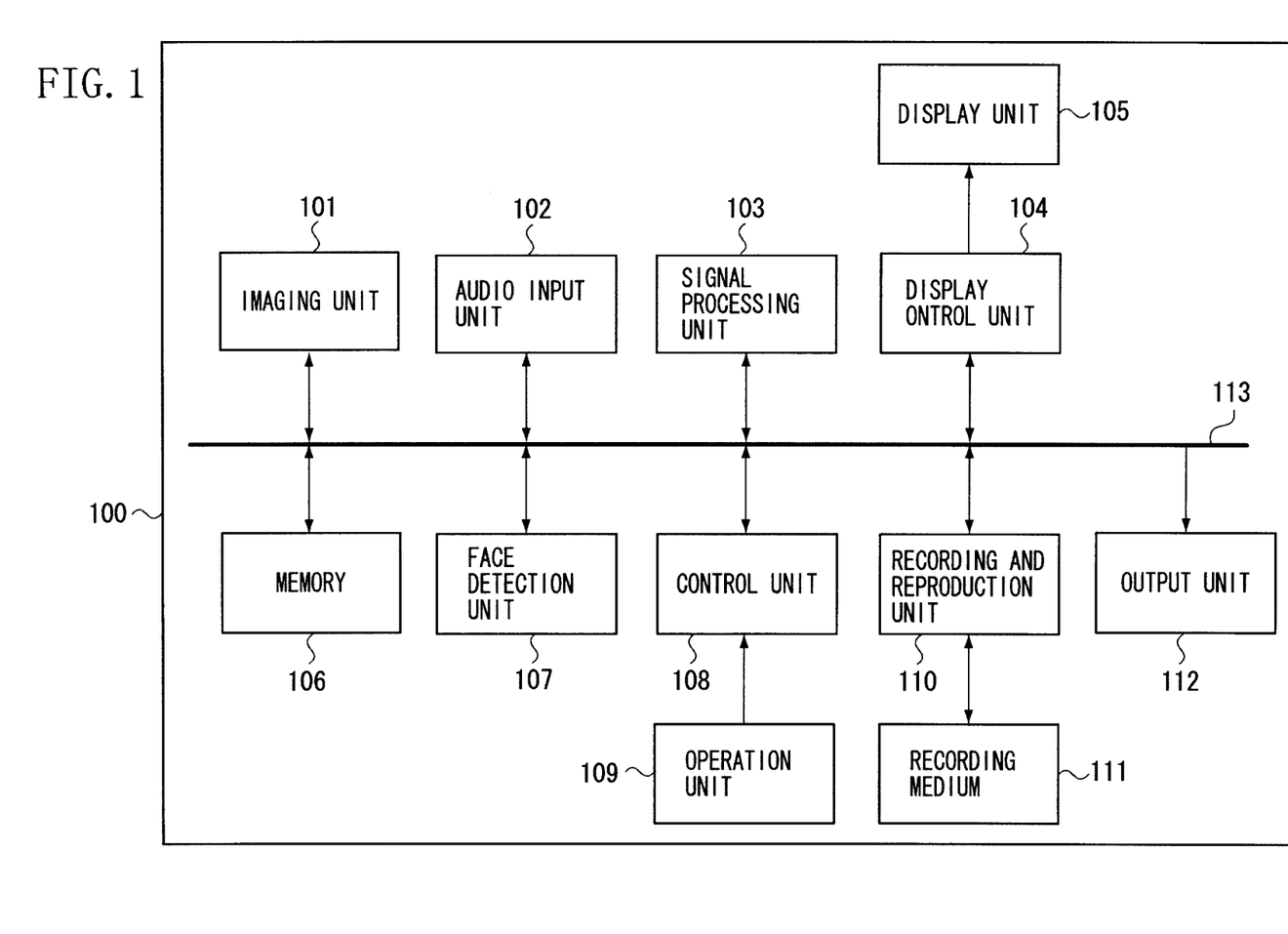
FIG. 1 illustrates a block diagram of a configuration of a video camera according to the exemplary embodiment of the present invention.

FIG. 1 illustrates a block diagram of a configuration of a video camera 100 according to the first exemplary embodiment of the present invention.

Referring to FIG. 1, an imaging unit 101 shoots an image of an object, and generates and outputs a moving image signal showing the object. The imaging unit 101 includes an optical system such as a zoom lens or a focusing lens, an image sensor such as a charge-coupled device (CCD), iris, an AD converter that converts the shot moving image signal into a digital signal, and a processing circuit that performs necessary processing of the shot moving image. The imaging unit 101 changes focusing, zoom operation, shutter speed, or iris at shooting time according to a control signal from a control unit 108. An audio input unit 102 externally obtains sound of the object, and outputs an audio signal. Further, the audio input unit 102 includes a microphone, an amplifier, and an AD converter, and outputs the obtained audio signal as a digital signal.

A signal processing unit 103 performs coding processing based on a well-known coding system, such as MPEG, of a moving image signal or an audio signal at recording time, and compresses the amount of information. The signal processing unit 103 also decodes the reproduced moving image signal or audio signal and decompresses the amount of information at reproduction time. A display control unit 104 outputs a moving image or various information to a display unit 105 in response to an instruction from the control unit 108. The display unit 105 includes a known display device such as a liquid crystal panel.

A memory 106 stores a moving image signal, an audio signal, or various information, which will be described later. A face detection unit 107 detects a face image included in a frame in the moving image signal output from the imaging unit 101 at the shooting time, and outputs face detection information as an amount of characteristics, e.g., as a number of faces, face position, or face size. The control unit 108 controls operations of units in the video camera 100 in response to an instruction from an operation unit 109. The control unit 108 has a microcomputer, and executes a program stored in a flash memory (not illustrated) to control the units. The operation unit 109 has various switches, e.g., a power switch, a trigger switch for instructing the start or stop of shooting a moving image, a zoom switch, a reproduction switch, a menu switch, and a change-over switch of a shooting mode.

A recording and reproduction unit 110 records the moving image signal or audio signal, or various information in a recording medium 111 in response to an instruction from the control unit 108, and reproduces the signal from the recording medium 111. The recording medium 111 is a random accessible recording medium such as a memory card or a hard disk drive (HDD). According to the present exemplary embodiment, with an attachment/discharge mechanism (not illustrated), a user can easily attach or discharge the recording medium 111 to/from the video camera 100. An output unit 112 externally outputs the moving image signal or audio signal obtained at the shooting time, or the reproduced moving image signal or audio signal to an external display device. An internal bus 113 is used to transfer various data or commands to the units in the video camera 100

Next, a description is given of basic shooting processing and reproduction processing with the video camera 100. First, a description is given of a shooting mode in the video camera 100. A power supply of the video camera 100 is turned on with the operation unit 109. The control unit 108 controls the units to display a moving image of an object corresponding to the moving image signal obtained by the imaging unit 101 on the display unit 105 and enter a recording pause status. In the status, if the operation unit 109 issues an instruction for starting the shooting, the control unit 108 controls the units to start the recording of the moving image signal and the audio signal.

If an instruction is issued from the control unit 108, the imaging unit 101 and the audio input unit 102 output the moving image signal and the audio signal, and temporarily store the signals in the memory 106 via the bus 113. The signal processing unit 103 encodes the moving image signal and the audio signal stored in the memory 106, and stores the signals in the memory 106 again. The recording and reproduction unit 110 reads the moving image signal and the audio signal from the memory 106 in response to the instruction from the control unit 108, and records the signals in the recording medium 111.

The face detection unit 107 reads the moving image signal stored in the memory 106 in response to the instruction from the control unit 108 after starting the shooting, and detects a face image contained in a frame of the moving image signal with the known method. The face detection unit 107 extracts candidates of the eye, the nose, the mouth, or the ear with pattern matching. The face detection unit 107 also determines one of the extracted candidates of the eyes as a pair of the eyes which satisfy a preset condition (e.g., the distance or inclination of the two eyes), and narrows only to the candidates having the pair of the eyes, as the candidate. The face detection unit 107 further forms a correspondence between the narrowed candidates of the eyes and another part (the nose, the mouth, or the ear) which forms the face, relating to the candidate, and detects the face with a preset non-face condition filter. Further, the face detection unit 107 outputs face detection information showing an amount of characteristics, such as the number of faces, position, or size, to the control unit 108.

The control unit 108 detects an elapse time (the number of frames) from the shooting start according to the face detection information output by the face detection unit 107. Further, the control unit 108 forms a correspondence between the elapse time from the shooting start of the frame in which the face is detected and the face detection information as to the frame, and stores the correspondence in the memory 106.

The control unit 108 controls the imaging unit 101 to execute the zoom operation with the operation unit 109 according to the operation during the shooting. The control unit 108 also detects the elapse time (the number of frames) from the shooting start according to the zoom operation. Further, the control unit 108 stores a correspondence between the time of the zoom operation and zoom information indicating the zoom direction in the memory 106.

The control unit 108 sequentially detects the motion of image between the frames in the moving image signal output from the imaging unit 101 in response to an instruction of the shooting start. The control unit 108 generates motion information indicating the amount of motion of the image between the frames, corresponding to the frame, and stores the generated information in the memory 106.

Further, the control unit 108 detects brightness (screen luminance) of the moving image signal corresponding to each frame, output from the imaging unit 101 in response to the instruction of the shooting start, generates brightness information indicating the brightness of the frame, and stores the generated information in the memory 106. The control unit 108 further calculates a peak of a spatial frequency for controlling the focusing based on the moving image signal output from the imaging unit 101. The control unit 108 furthermore generates focusing information indicating a peak value of the frame, and stores the generated information in the memory 106.

The control unit 108 sequentially generates various information during shooting the moving image, and stores the generated information in the memory 106. Further, the control unit 108 controls the recording and reproduction unit 110 in response to an instruction for suspending the shooting from the operation unit 109, and suspends the recording of the moving image signal and the audio signal in the recording medium 111. According to the present exemplary embodiment, the recording and reproduction unit 110 manages the moving image signal and the audio signal recorded in the recording medium 111, as the moving image file, under a predetermined file system.

According to the present exemplary embodiment, the recording and reproduction unit 110 also manages, as one file, a series of the moving image signals and the audio signals recorded during a period from the instruction of the shooting start to the instruction of the shooting suspension. The control unit 108 generates a management file indicating the amount of data starting from the head of each I picture in the moving image signal. The control unit 108 further obtains information on the shooting date based on a timer (not illustrated), and stores information on the shooting date corresponding to the moving image file in the management file. The recording and reproduction unit 110 records the management file of the moving image file in the recording medium 111.

The control unit 108 reads the face detection information, zoom information, motion information, brightness information, and focusing information from the memory 106 in response to the instruction for suspending the shooting. The control unit 108 generates an additional information file including the above information, and the recording and reproduction unit 110 records the generated file in the recording medium 111. At this time, the recording and reproduction unit 110 records the additional information file to identify additional information corresponding to the moving image file.

One additional information file can be created for each moving image file. Alternatively, one additional information file may be created to all moving image files recorded in the recording medium 111. Alternatively, the additional information may be stored in a management file of the moving image file without recording the additional information file.

Next, a description is given of normal reproduction processing. In a normal reproduction mode, all frames in the moving image file are reproduced and displayed.

In response to a switching instruction to the reproduction mode with the operation unit 109, the control unit 108 controls the recording and reproduction unit 110 to reproduce a head portion of the moving image signal included in the moving image file recorded in the recording medium 111. The recording and reproduction unit 110 transmits a head portion of the reproduced moving image signal to the signal processing unit 103. The signal processing unit 103 decodes a head screen of the reproduced moving image signal, and transmits the decoded head screen to the display control unit 104. The display control unit 104 reduces the size of the decoded head screen, generates an index screen indicating a representative image, and displays the generated index screen on the display unit 105. The user operates the operation unit 109, selects a desired representative image in representative images of the moving image file displayed on the display unit 105, and instructs the reproduction of the selected image.

In response to the reproduction instruction, the control unit 108 controls the recording and reproduction unit 110 to reproduce the moving image file corresponding to the selected representative image. The recording and reproduction unit 110 reproduces the designated moving image file from the recording medium 111, and stores the reproduced file in the memory 106. The signal processing unit 103 reads and decodes the moving image signal and the audio signal from the memory 106, and stores the signals in the memory 106 again. The display control unit 104 reads the decoded moving image signal from the memory 106, and displays the reproduced moving image signal on the display unit 105. The audio signal is output from a speaker (not illustrated). The control unit 108 suspends the reproduction of the moving image file using the recording and reproduction unit 110 in response to the instruction for suspending the reproduction, and enables the display unit 105 to display the representative image again.

Next, a description is given of reproduction of highlight (digest) with the video camera 100. In the highlight reproduction mode, a part of the period of the recorded moving images is selected, the moving image for the selected period is reproduced, and a moving image for the other period is not reproduced. The user operates the operation unit 109 to turn on the power source of the video camera 100. Then, the control unit 108 enables the recording and reproduction unit 110 to sequentially reproduce the additional information file in all moving image files recorded in the recording medium 111. The recording and reproduction unit 110 reproduces the additional information file from the recording medium 111, and stores the reproduced file in the memory 106.

Figure 3:
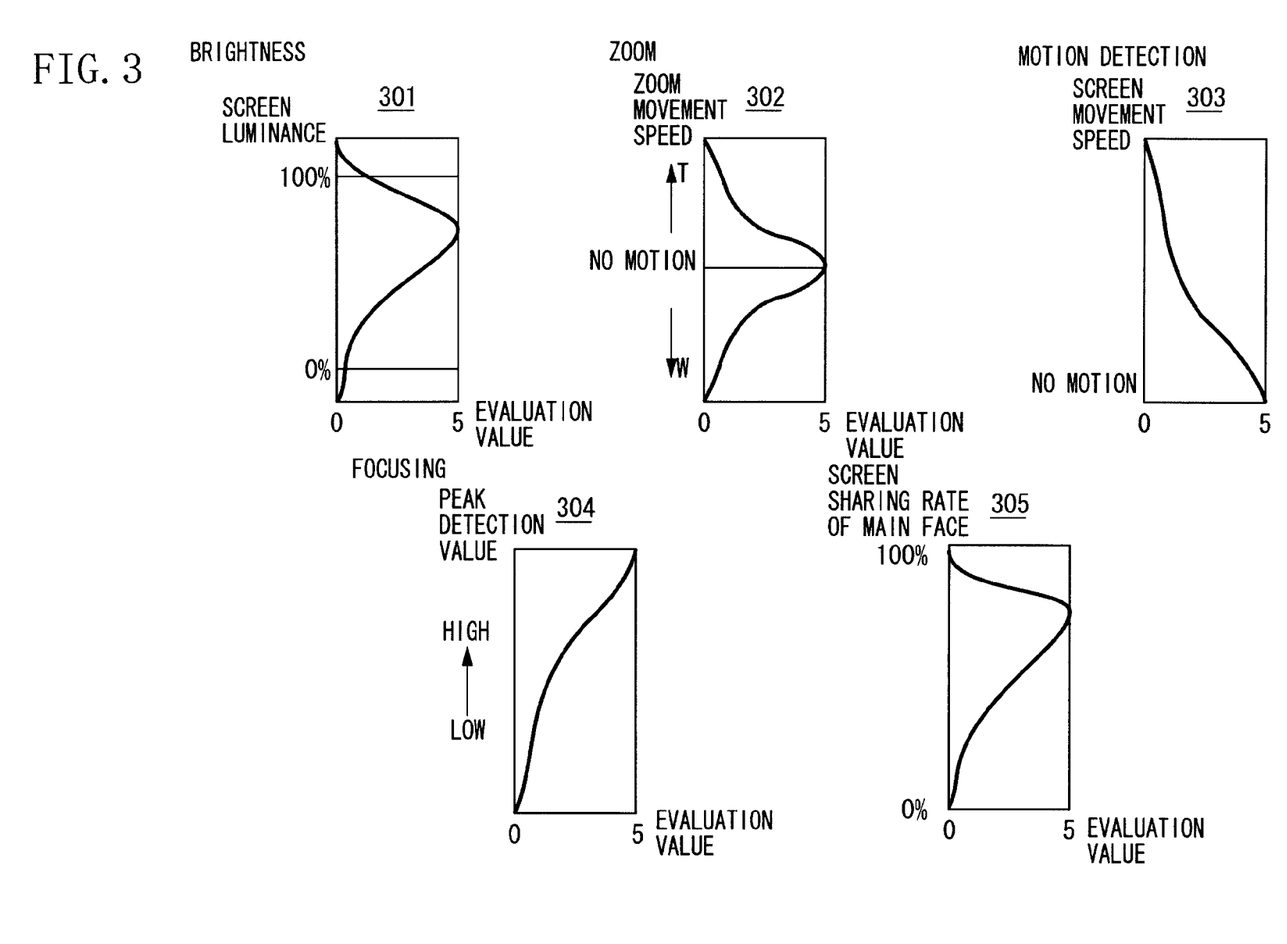
FIG. 3 illustrates a condition for calculating an evaluation value of each evaluation item.

The control unit 108 calculates an evaluation value of a frame of the moving image signal based on the face information, zoom information, motion information, brightness information, and focusing information included in the additional information file stored in the memory 106. Diagrams 301 to 305 in FIG. 3 illustrate conditions when calculating the evaluation values by using the brightness information, zoom information, motion information, focusing information, or face information.

With respect to the brightness, the evaluation value is gradually reduced with respect to the luminance of the entire screen with 70% as the maximum luminance. With respect to the zoom, if there is not zoom shift, the evaluation value is maximum and the evaluation value is reduced as the motion increases. With respect the motion, if the detected amount of motion is large, the evaluation value is reduced. With respect to the focusing, if a peak detection value is high, the evaluation value is also high. With respect to the face, if a screen sharing rate of a main face is high, the evaluation value is basically high. However, if the screen sharing rate of the main face is excessively high, the evaluation value is low.

The control unit 108 weights the calculated evaluation value under a predetermined condition, thereby calculating the final evaluation value of the frame. Specifically, the control unit 108 adds a value obtained by multiplying the evaluation value by a predetermined weighted value, and calculates the final evaluation value by dividing the addition result by the total value of weight values.

Figure 4:
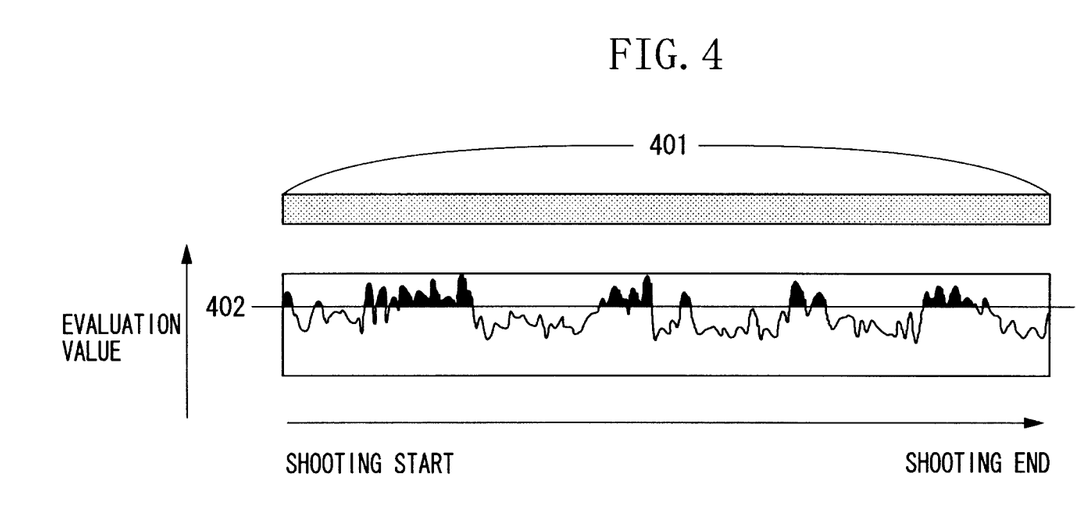
FIG. 4 illustrates a diagram of a status of an evaluation value of a moving image.

The control unit 108 stores the calculated evaluation value in the memory 106 when similar calculation of the evaluation values is completed for all frames. FIG. 4 illustrates a status of the calculated evaluation value of the frame in one moving image file 401 recorded in the recording medium 111.

The control unit 108 compares the calculated evaluation value of the frame with a threshold, and detects a frame having the evaluation value that is the threshold value or more. Further, the control unit 108 selects the detected frame as a frame to be reproduced as highlight, and stores information indicating the position of the frame selected in the moving image signal, as highlight reproduction information, in the memory 106. Referring to FIG. 4, a frame having the evaluation value that is a threshold 402 or more is a black portion. The control unit 108 stores the position of a frame having the evaluation value that is the threshold or more, as the highlight reproduction information, in the memory 106. The length or the number of the highlight reproduction periods may be adjusted by properly changing the threshold.

Figure 2:
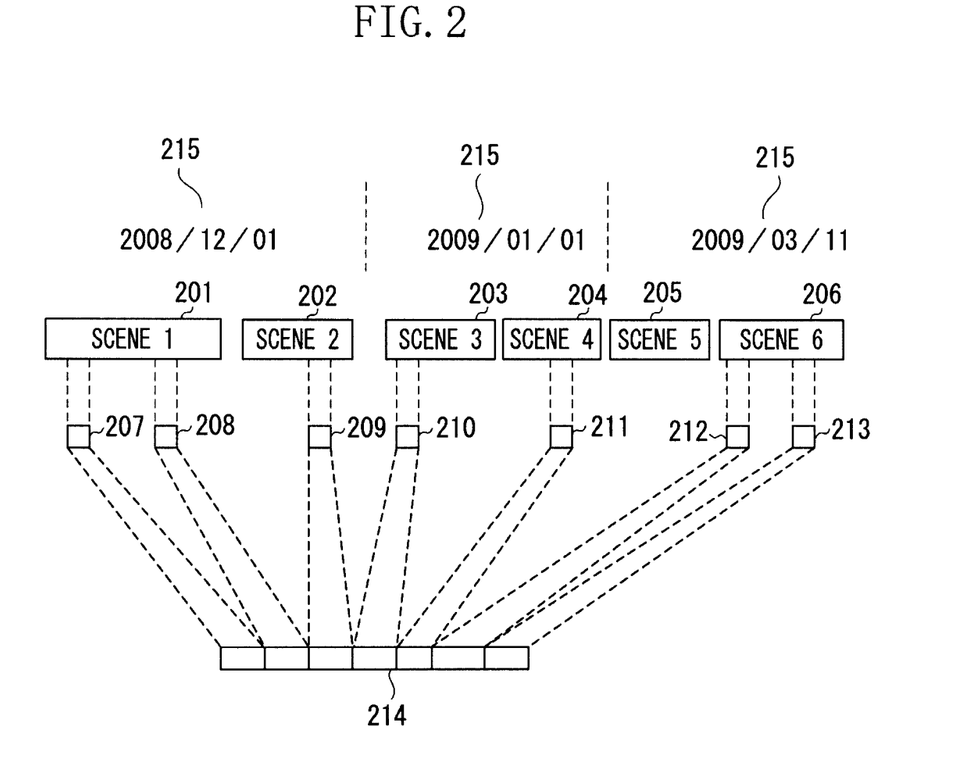
FIG. 2 illustrates a diagram of a reproduction period in a highlight reproduction mode.

FIG. 2 illustrates the moving image file recorded in the recording medium 111 and a status of the highlight reproduction period. Referring to FIG. 2, six moving image files 201 to 206 having scene Nos. 1 to 6 are recorded in the recording medium 111. The scene No. is independently added to the moving image file. According to the present exemplary embodiment, each time when recording one moving image file, the scene No. is incremented by one, and information on the scene No. is stored and recorded in the moving image file. Highlight reproduction periods 207 to 213 are those for the moving image files 201 to 206. The moving image file 205 having the scene No. 5 does not include the highlight reproduction period. According to the present exemplary embodiment, the length or the number of the highlight reproduction period is not limited in the moving image file. Therefore, there can be the moving image file without the highlight reproduction period. A moving image 214 is obtained when continuously reproducing images for the highlight reproduction periods 207 to 213. A shooting date 215 is a date when the moving image file is captured.

Figure 5:
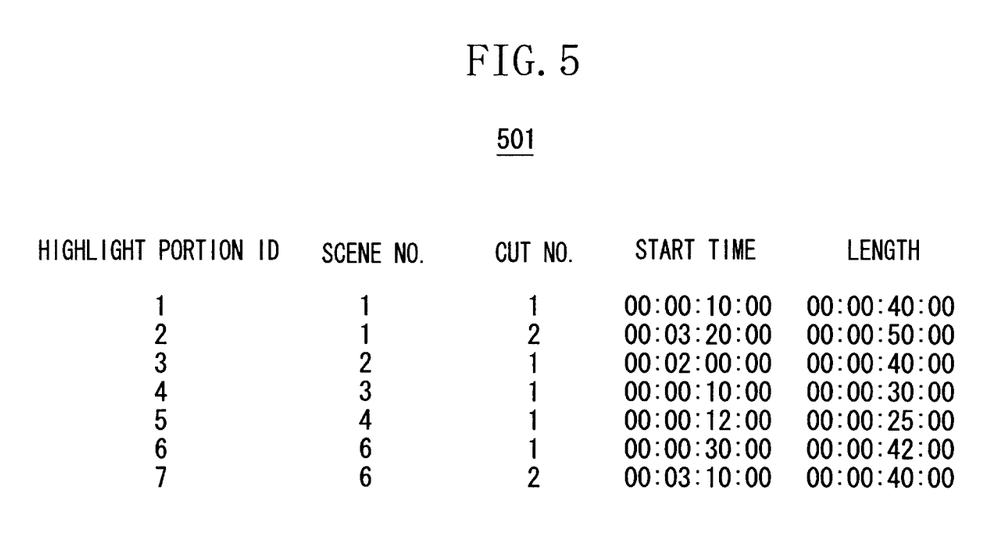
FIG. 5 illustrates a diagram of highlight information.

FIG. 5 illustrates a status of highlight reproduction information 501 in the moving image files in FIG. 2. The highlight information 501 is used when recording six moving image files having scene Nos. 1 to 6 in the recording medium 111. A highlight portion ID is identification information commonly added to all highlight portions in the moving image file recorded in the recording medium 111. A cut No. is information indicating the order of highlight portions in one moving image file. Information on reproduction start time (start position) of the highlight portion and the length information thereof is recorded.

According to the present exemplary embodiment, each time when the video camera 100 is turned on, the control unit 108 generates highlight information 201 and stores the generated highlight information 201 in the memory 106. In addition, the generated highlight information 201 can be recorded in the recording medium 111 as a file. Each time when recording one moving image file, the control unit 108 determines the highlight reproduction period of the moving image file, and updates the highlight information 501.

Next, a description is given of processing in the highlight reproduction mode with the highlight information 501. According to the present exemplary embodiment, there is a normal reproduction mode for sequentially reproducing the moving image files recorded in the recording medium 111 from the head moving image file. Further, there is a highlight reproduction mode for selecting a part of the reproduction period described in the highlight information of the moving image signals recorded in the recording medium 111 and reproducing the selected highlight.

The user operates the operation unit 109, thereby setting the highlight reproduction mode and instructing the highlight reproduction. Further, the user operates the operation unit 109 during the reproduction of the moving image in the normal reproduction mode, thereby switching the video camera 100 to the highlight reproduction mode and reproducing the moving image. Furthermore, the user operates the operation unit 109 during reproduction of the moving image in the highlight reproduction mode, thereby switching the video camera 100 to the normal reproduction mode and reproducing the moving image.

Figure 6:
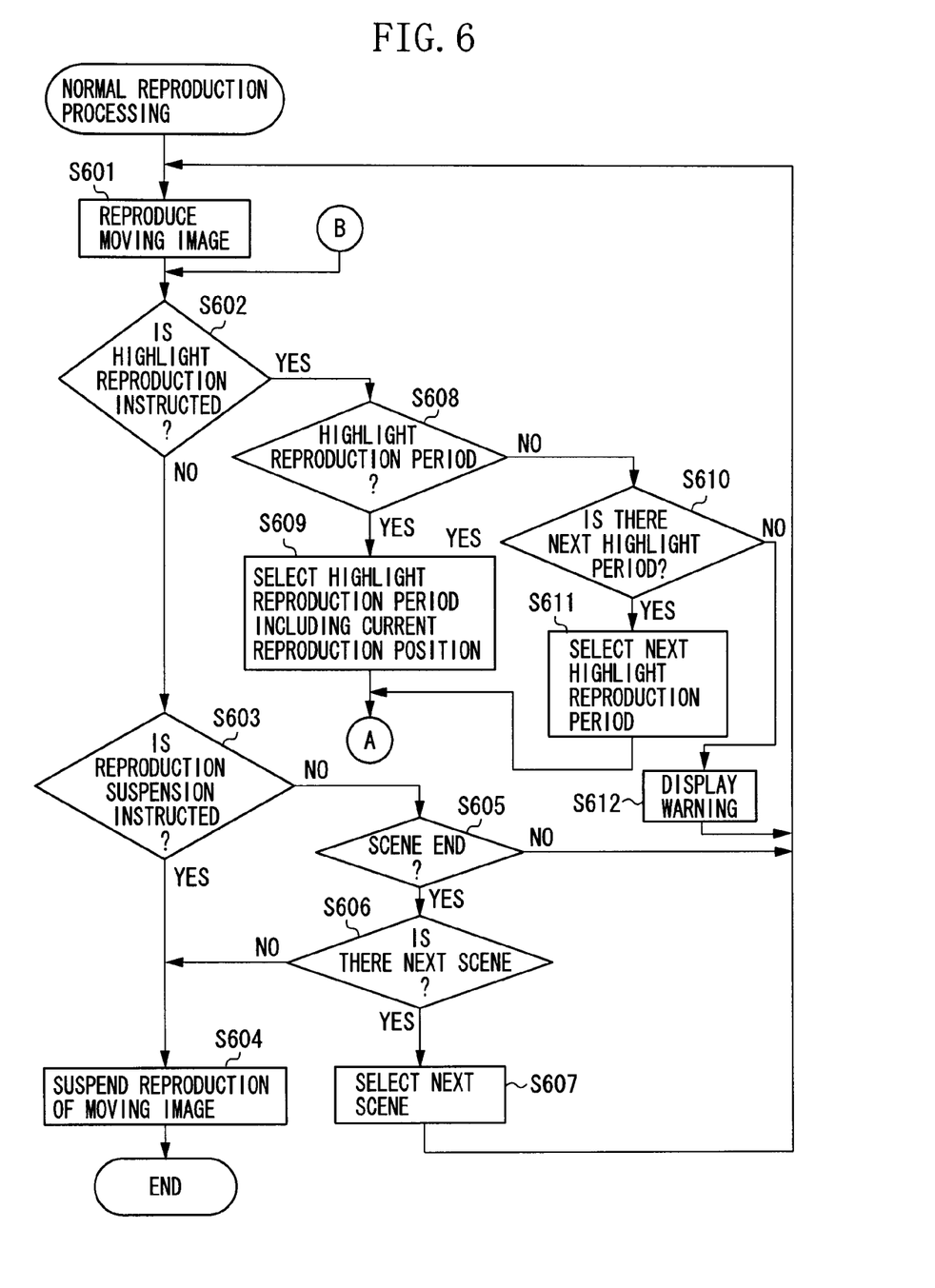
FIG. 6 illustrates a diagram of processing in a normal reproduction mode.
Figure 7:
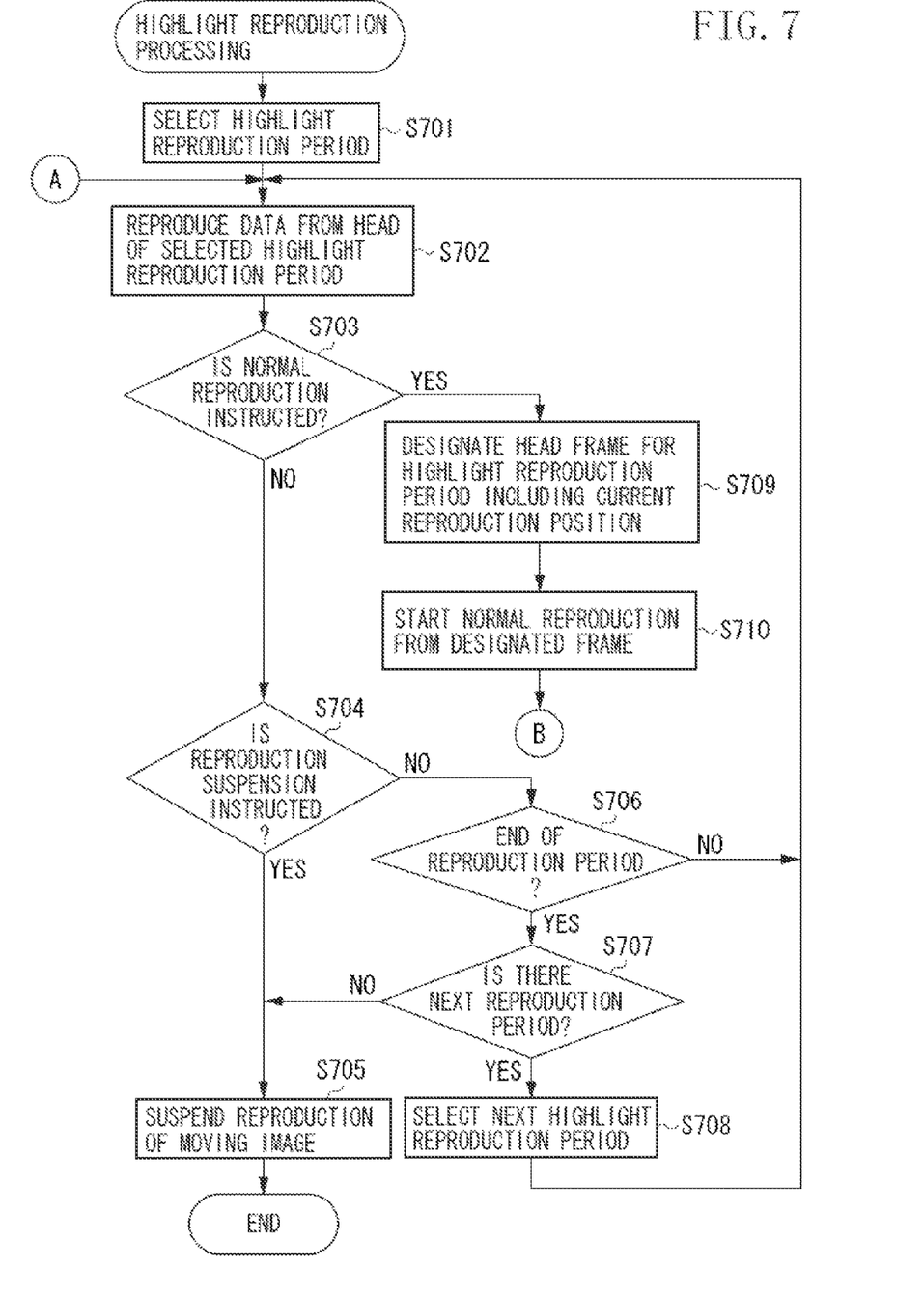
FIG. 7 illustrates a diagram of processing in the highlight reproduction mode.

Next, a description is given of switching processing between the normal reproduction mode and the highlight reproduction mode with reference to flowcharts in FIGS. 6 and 7. FIG. 6 illustrates processing in the normal reproduction mode. FIG. 7 illustrates processing in the highlight reproduction mode. The control unit 108 controls the units, thereby executing the processing in FIGS. 6 and 7.

The user operates the operation unit 109 to set the reproduction mode, and instructs the selection and reproduction of a desired representative image. Then, the processing starts. In step S601, the recording and reproduction unit 110 reproduces the moving image file corresponding to the selected representative image from the head moving image file, and outputs the moving image and sound in the reproduced moving image file. In step S602, the control unit 108 determines whether or not the instruction for switching to the highlight reproduction mode is received. When the instruction for switching to the highlight reproduction mode is not received (NO in step S602), in step S603, the control unit 108 determines whether or not the reproduction suspension is instructed. When the reproduction suspension is instructed (YES in step S603), in step S604, the control unit 108 suspends the reproduction of the moving image file with the recording and reproduction unit 110, and displays the index screen on the display unit 105 again.

When the reproduction suspension is not instructed (NO in step S603), in step S605, the control unit 108 determines whether or not the position reaches the end of the scene (moving image file) being reproduced. When the position does not reach the end of the scene (NO in step S605), the control unit 108 returns the operation to step S601 and the reproduction still continues. When the position reaches the end of the scene (YES in step S605), in step S606, the control unit 108 determines whether or not the next scene is recorded. According to the present exemplary embodiment, the moving image files are sequentially reproduced in the shooting order based on the management file of the moving image files. When the current scene being reproduced is a finally shot scene and the next scene is not recorded (NO in step S606), the control unit 108 proceeds to step S604 and the reproduction of the moving image is suspended. When the next scene is present (YES in step S606), the next scene is selected and the control unit 108 returns the processing to step S601 and the reproduction of the moving image continues.

When the instruction for switching to the highlight reproduction mode is received (YES instep S602), in step S608, the control unit 108 determines, based on the highlight information 501, whether or not the current reproduction position is included in the highlight reproduction period. When at the time of receiving the instruction for switching to the highlight reproduction mode, the reproduction position is included in the highlight reproduction period (YES in step S602), in step S609, the control unit 108 selects the highlight reproduction period for which there is the current reproduction position.

The control unit 108 switches the normal reproduction mode to the highlight reproduction mode, and executes the highlight reproduction processing. When at the time of receiving the instruction for switching to the highlight reproduction mode, the reproduction position is not included in the highlight reproduction period (NO instep S608), instep S610, the control unit 108 determines whether or not there is the next highlight reproduction period after the current reproduction position in the scene being reproduced. When there is the next highlight reproduction period (YES in step S610), instep S611, the control unit 108 selects the highlight reproduction period that is closest to the scene being reproduced after the current reproduction position.

The control unit 108 switches the normal reproduction mode to the highlight reproduction mode, and executes the highlight reproduction processing. When there is not the next highlight reproduction period after the current reproduction position in the scene being reproduced (NO in step S610), in step S612, the control unit 108 displays warning information indicating that there is not the next highlight reproduction period in the scene being reproduced on the display unit 105, and continues the reproduction processing. Even when there is not the highlight reproduction period after the current reproduction position (NO in step S610), if there is next the highlight reproduction period before the current reproduction position in the same scene, the control unit 108 may select the highlight reproduction period.

In the normal reproduction mode, in response to the reception of the instruction for switching to the highlight reproduction mode from the user, the control unit 108 switches the video camera 100 to the highlight reproduction mode, and executes the processing in FIG. 7.

More specifically, when the highlight reproduction period is selected (YES in steps S609 or S611), the control unit 108 shifts the operation to step S702 and the recording and reproduction unit 110 starts the reproduction of the moving image file from the head frame for the selected highlight reproduction period. In step S703, the control unit 108 determines whether or not the instruction for switching to the normal reproduction mode is received. When the instruction for switching to the normal reproduction mode is not received (NO in step S703), in step S704, the control unit 108 determines whether or not the reproduction suspension is instructed. When the reproduction suspension is instructed (YES in step S704), in step S705, the control unit 108 suspends the reproduction of the moving image file with the recording and reproduction unit 110, and displays the index screen on the display unit 105 again.

When the reproduction suspension is not instructed (NO in step S704), in step S706, the control unit 108 determines whether or not the reproduction period of highlight being reproduced reaches the end. When the highlight reproduction period does not reach the end (NO in step S706), the control unit 108 returns the processing to step S702 and the reproduction still continues. When the highlight reproduction period reaches the end (YES in step S706), in step S707, the control unit 108 determines, based on the highlight information 501 stored in the memory 106, whether or not there is the next highlight reproduction period. When the current highlight reproduction period being reproduced is the end and there is not the next highlight reproduction period (NO in step S707), the control unit 108 suspends the reproduction of the moving image. When there is the next highlight reproduction period (YES in step S707), in step S708, the control unit 108 selects the next highlight reproduction period, and returns the processing to step S702 and the reproduction of the moving image continues.

When the instruction for switching to the normal reproduction mode is received (YES in step S703), in step S709, the control unit 108 designates, based on the highlight information 501, the head frame of the highlight reproduction period which includes the current reproduction position. In step S710, the control unit 108 switches the video camera 100 to the normal reproduction mode, starts the normal reproduction of the moving image file from the designated frame. Then, the control unit 108 shifts the processing to step S602 in FIG. 6. Thereafter, the control unit 108 executes the processing in FIG. 6 again.

For example, in the highlight reproduction mode, when the instruction for switching to the normal reproduction mode is received while reproducing the image for the highlight reproduction period 210 in FIG. 2, the control unit 108 starts the reproduction of the moving image in the normal reproduction mode from the head frame for the highlight reproduction period 201.

According to the present exemplary embodiment, the user selects a representative screen while the index screen is displayed on the display unit 105, and the highlight reproduction is instructed, thereby executing the highlight reproduction processing in FIG. 7. When the highlight reproduction is instructed, in step S701, the control unit 108 selects the first highlight reproduction period of the moving image file corresponding to the selected representative image based on the highlight information 501 stored in the memory 106. When the moving image file corresponding to the selected representative image does not include the highlight reproduction period, the control unit 108 selects the closest reproduction period from the highlight reproduction period after the next moving image file.

In step S702, the control unit 108 starts the reproduction of the moving image file from the head of the selected highlight reproduction period. The subsequent processing is similar to the foregoing.

According to the first exemplary embodiment, in the normal reproduction mode, when the switching to the highlight reproduction mode is instructed during the reproduction of the moving image, the control unit 108 switches the video camera 100 to the highlight reproduction mode for selecting and reproducing a part of the period of the recorded moving image to reproduce the moving image. When the switching to the normal reproduction mode is instructed during the reproduction of the moving image in the highlight reproduction mode, the highlight reproduction mode is switched to the normal reproduction mode to reproduce the moving image. At this time, the control unit 108 starts the reproduction of the moving image in the normal reproduction mode from the head of the highlight reproduction period without subsequently starting the reproduction of the moving image in the normal reproduction mode from the reproduction position when the instruction for switching to the normal reproduction mode is received.

Therefore, the user easily switches the highlight reproduction to the normal reproduction. Further, the control unit 108 starts the reproduction of the moving image from a proper position before the reproduction position at the time of receiving the instruction for switching to the highlight reproduction mode, when the video camera 100 is switched to the highlight reproduction mode.

According to the first exemplary embodiment, the reproduction of the moving image in the normal reproduction mode starts from the head of the highlight reproduction period when the instruction for switching to the normal reproduction mode is received. In addition, the reproduction of the moving image in the normal reproduction mode may start from the head of a scene (moving image file).

Among the moving image files shot on the same day as that of the moving image file when the instruction for switching to the normal reproduction mode is received, the reproduction of the moving image in the normal reproduction mode may start from the head of the first moving image file.

Next, a description is given of the second exemplary embodiment. According to the present exemplary embodiment, the configuration of the video camera 100, the basic shooting, and the reproduction processing are similar to those according to the first exemplary embodiment. According to the first exemplary embodiment, when receiving the instruction for switching to the normal reproduction mode in the highlight reproduction mode, the control unit 108 automatically selects the head of the highlight reproduction period being reproduced, and starts the normal reproduction. According to the present exemplary embodiment, when receiving the instruction for switching to the normal reproduction mode in the highlight reproduction mode, the user selects any of predetermined reproduction positions and starts the reproduction of the moving image in the normal reproduction mode from the selected reproduction position.

Figure 8:
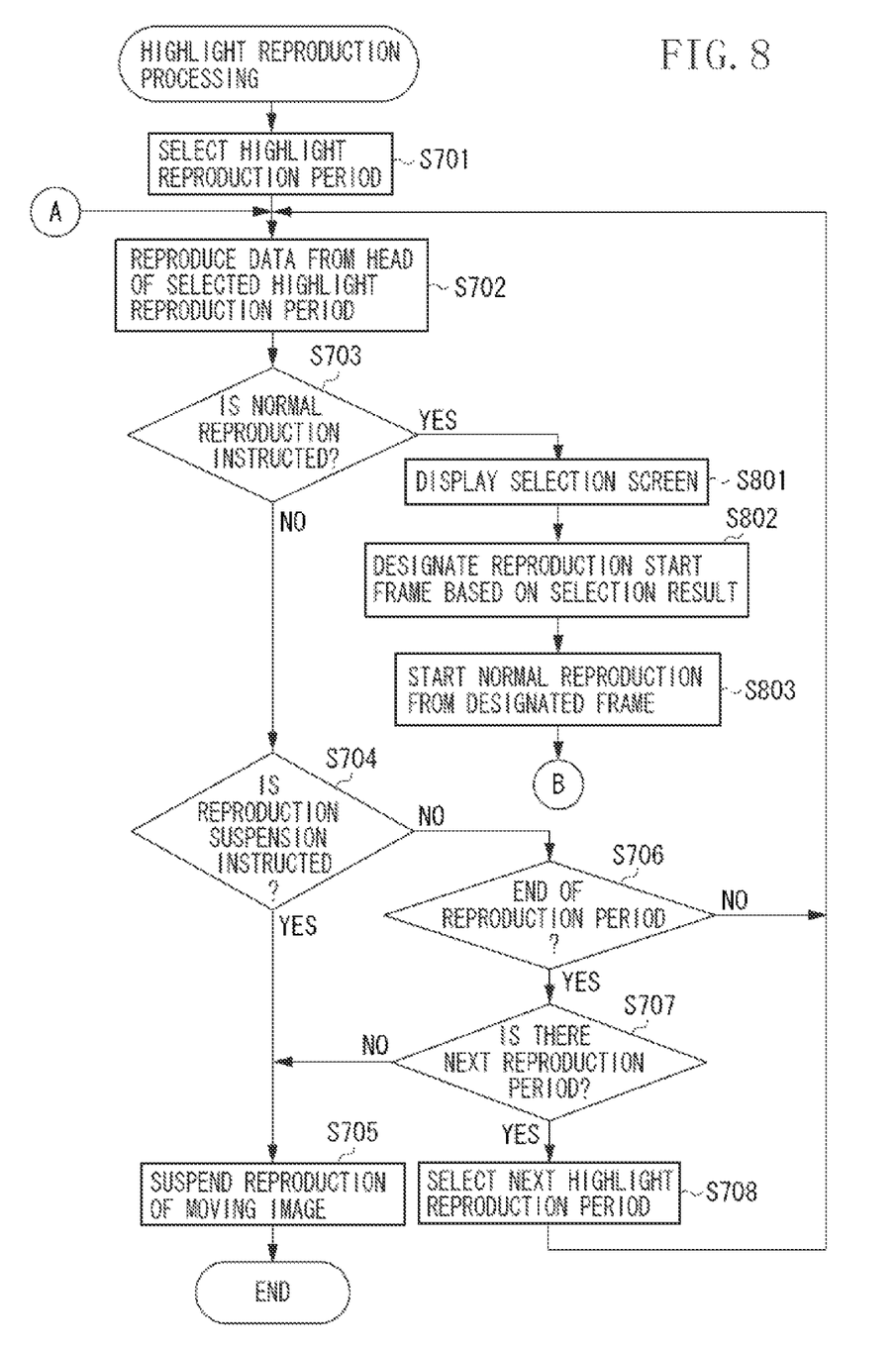
FIG. 8 illustrates a diagram of another processing in the highlight reproduction mode.

FIG. 8 illustrates a flowchart of processing in the highlight reproduction mode according to the second exemplary embodiment. Referring to FIG. 8, the same processing as that in FIG. 7 is designated by the same reference numeral, and is not described. In the processing in FIG. 8, in step S703, processing after receiving the instruction for switching to the normal reproduction mode is different from that in FIG. 7.

Figure 9A:
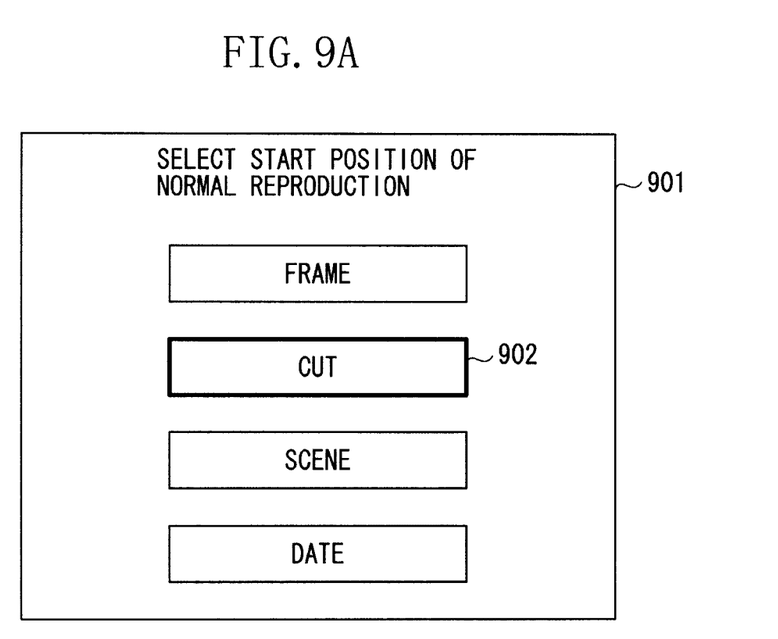
FIGS. 9A and 9B illustrate diagrams of a selection screen.

When receiving the instruction for switching to the normal reproduction mode (YES in step S703), in step S801, the control unit 108 controls the display control unit 104 to display the selection screen at the reproduction start position on the display unit 105. FIG. 9A illustrates an example of the selection screen. According to the present exemplary embodiment, the reproduction start position can be selected from the following four predetermined positions.

1. Current frame
2. Head of the highlight reproduction period for which there is the current reproduction position
3. Head of the current scene being reproduced
4. Head of the moving image file shot on the same shooting day as that of the current scene being reproduced The display unit 105 displays the selection screen 901. Then, the user operates the operation unit 109 to move a cursor 902 for selection, thereby selecting a desired reproduction start position.

When the reproduction start position is selected, in step S802, the control unit 108 designates the reproduction start frame based on the selection result. After selecting the current frame, the control unit 108 designates the current frame as the reproduction start frame. When the cut is selected, the control unit 108 designates the head frame of the highlight reproduction period which includes the current reproduction position based on the highlight information stored in the memory 106. When the scene is selected, the control unit 108 designates the head frame of the current scene being reproduced. When the date is selected, the control unit 108 designates the head frame in the head file from the moving image files shot on the same shooting day as the current scene being reproduced.

Thus, when the reproduction start frame is designated, in step S803, the control unit 108 switches the video camera 100 to the normal reproduction mode, and starts the normal reproduction of the moving image file from the designated frame. Then, the control unit 108 shifts the processing to step S602 in FIG. 6.

Thus, according to the present exemplary embodiment, the user easily switches the highlight reproduction to the normal reproduction. When switching the normal reproduction mode to the highlight reproduction mode, the control unit 108 can start the reproduction of the moving image from a desired position.

According to the present exemplary embodiment, the selection screen 901 in FIG. 9A is displayed in response to the reception of the instruction for switching to the normal reproduction mode. Alternatively, the selection screen 901 may be displayed when instructing a pause during the reproduction in the highlight reproduction mode.

Figure 9B:
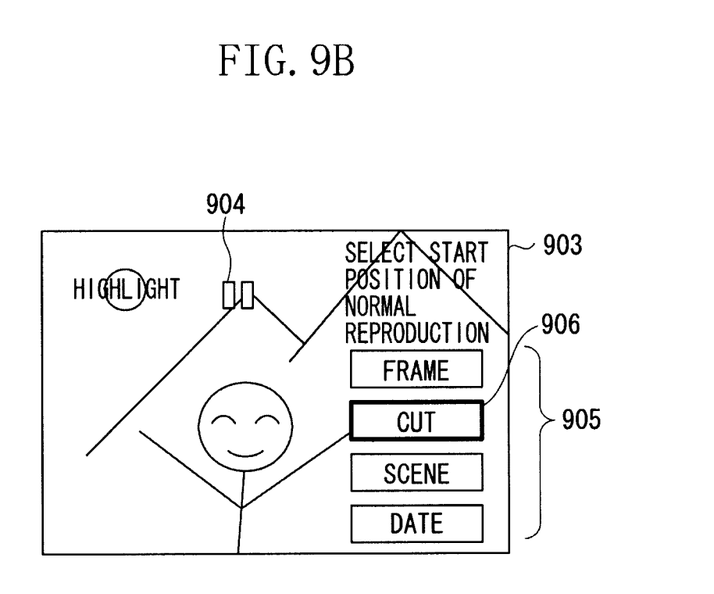

When instructing the pause during the reproduction in the highlight reproduction mode, for example, the display control unit 104 enables the display unit 105 to display a display screen 903 in FIG. 9B. Referring to FIG. 9B, the display screen 903 for pause displays information 904 indicating the pause, an item 905 for selecting the reproduction start position, and a cursor 906 for selection. The user operates the operation unit 109 to move the cursor 906 for selection, thereby selecting a desired reproduction start position.

Figure 10:
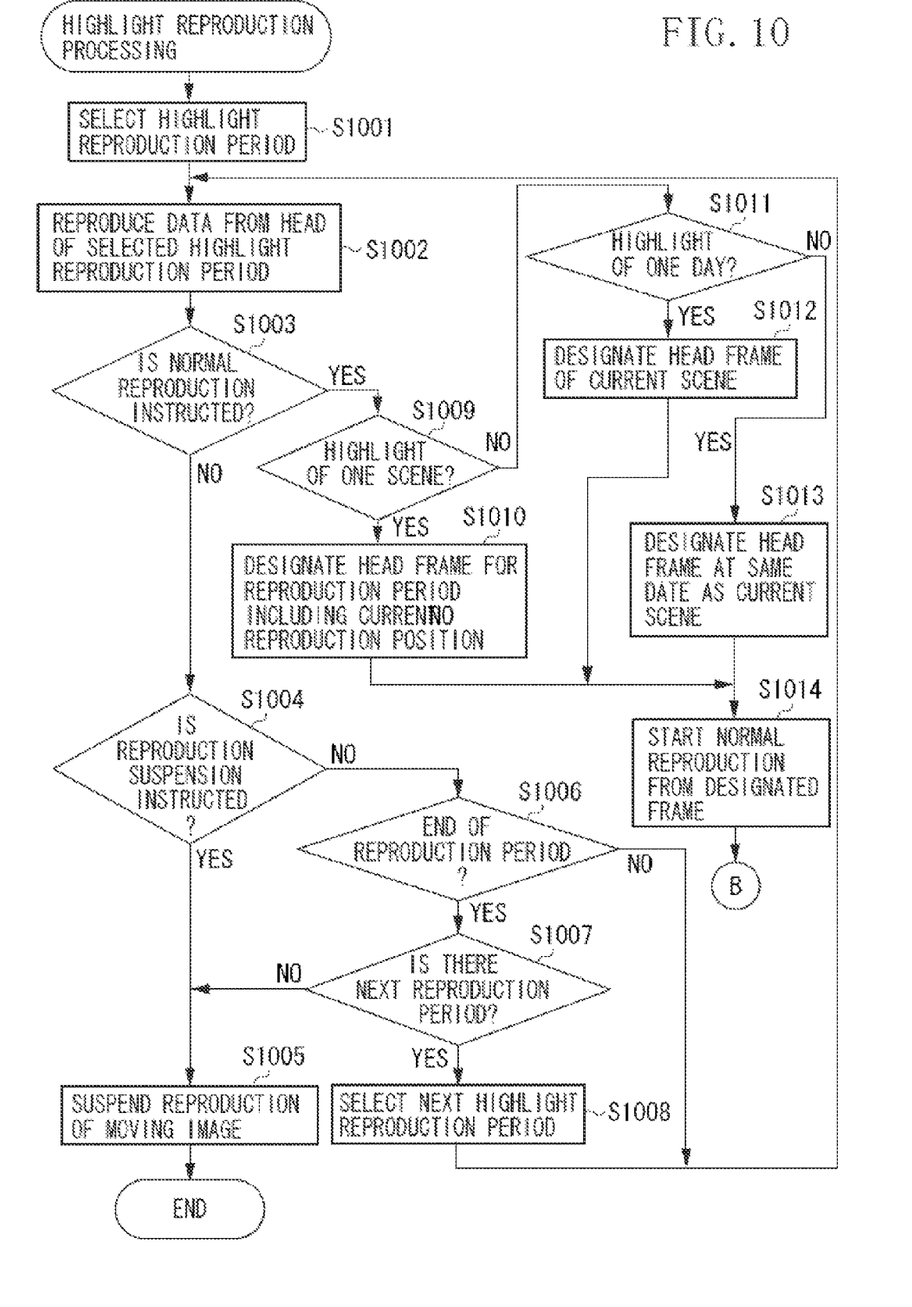
FIG. 10 illustrates a diagram of another processing in the highlight reproduction mode

Next, the third exemplary embodiment is described. According to the present exemplary embodiment, the configuration of the video camera 100, the basic shooting, and the reproduction processing are similar to those according to the first exemplary embodiment. FIG. 10 illustrates a flowchart of highlight reproduction processing according to the present exemplary embodiment.

According to the present exemplary embodiment, the user can designate a target period of the highlight reproduction. For example, the user selects one scene to instruct the highlight reproduction. Alternatively, the user can designate a target period of the highlight reproduction by the shooting day. When the user operates the operation unit 109 to instruct the setting of the target period while the display unit 105 displays the index screen in the reproduction mode, the display control unit 104 causes the display unit 105 to display a setting screen of the target period of the highlight reproduction. The user operates the operation unit 109 to designate the start day and the end day of the target period of the highlight reproduction. When the same date is set to the start day and the end day, the highlight for one day on the designated shooting day is reproduced.

Thus, when the highlight reproduction is instructed while the target period of the highlight reproduction is designated, processing in FIG. 10 starts. In step S1001, the control unit 108 selects the highlight reproduction period based on the target period designated by the user and the highlight information stored in the memory 106.

When the highlight reproduction of one scene is designated, for example, the control unit 108 selects the highlight reproduction period of the designated scene based on the highlight information 501. When the highlight reproduction is designated for one day, the control unit 108 selects the first highlight reproduction period from the moving image files at the designated shooting day. When the start day of the target period is different from the end day, the control unit 108 selects the first highlight reproduction period for the designated target period.

When the highlight reproduction period is selected, in step S1002, the control unit 108 controls the recording and reproduction unit 110 to start the reproduction of the moving image file from the head of the selected highlight reproduction period. In step S1003, the control unit 108 determines whether or not the instruction for switching to the normal reproduction mode is received. When the instruction for switching to the normal reproduction mode is not received (NO in step S1003), in step S1004, the control unit 108 determines whether or not the reproduction suspension is instructed. When the reproduction suspension is instructed (YES in step S1004), in step S1005, the control unit 108 suspends the reproduction of the moving image file with the recording and reproduction unit 110, and displays the index screen on the display unit 105 again.

When the reproduction suspension is not instructed (NO in step S1004), in step S1006, the control unit 108 determines whether or not the highlight reproduction period being reproduced reaches the end. When the highlight reproduction period does not reach the end (NO in step S1006), the control unit 108 returns to step S1002 and the reproduction still continues. When the highlight reproduction period reaches the end (YES in step S1006), in step S1007, the control unit 108 determines, based on the highlight information 501 stored in the memory 106 and the designated highlight target period, whether or not there is the next highlight reproduction period. When the reproduction period of the current highlight being reproduced is the end of the target period of the highlight reproduction and there is not the next highlight reproduction period (NO in step S1007), the control unit 108 suspends the reproduction of the moving image. When there is the next highlight reproduction period (YES in step S1007), in step S1008, the control unit 108 selects the next highlight reproduction period and continues the reproduction of the moving image.

When the scene 201 in FIG. 2 is designated as a target of the highlight reproduction, the control unit 108 suspends the highlight reproduction when the reproduction is carried out up to the end of the highlight reproduction period 208. Referring to FIG. 2, when 1 Jan. in 2009 is designated as the target period, the control unit 108 starts the highlight reproduction from the head of the highlight reproduction period 210. When the reproduction is carried out up to the end of the highlight reproduction period 211, the control unit 108 suspends the reproduction. When a period from 1 Dec. in 2008 to 1 Jan. in 2009 is designated as the target period of the highlight reproduction, the control unit 108 starts the highlight reproduction from the head of the highlight reproduction period 207, the image is reproduced up to the end of the highlight reproduction period 211, and the control unit 108 then suspends the reproduction.

When the instruction for switching to the normal reproduction mode is received (YES in step S1003), in step S1009, the control unit 108 determines whether or not the highlight reproduction of one scene is designated as the target period of the highlight reproduction. When the highlight reproduction of one scene is designated (YES in step S1009), in step S1010, the control unit 108 designates the head frame for the highlight reproduction period which includes the current reproduction position based on the highlight information 501. In step S1014, the control unit 108 switches the video camera 100 to the normal reproduction mode, starts the normal reproduction of the moving image file from the designated frame. Then, the control unit 108 shifts the processing to S602 in FIG. 6.

For example, when the scene 201 in FIG. 2 is designated as the target period of the highlight reproduction and the instruction for switching to the normal reproduction mode is received during the reproduction for the highlight reproduction period 208, the control unit 108 designates the head frame for the highlight reproduction period 208.

When the highlight reproduction of one scene is not designated, in step S1011, the control unit 108 determines whether or not the highlight reproduction for one day is designated. When the highlight reproduction is designated for one day (YES in step S1011), in step S1012, the control unit 108 designates the head frame of the current scene being reproduced. In step S1014, the control unit 108 switches the video camera 100 to the normal reproduction mode, starts the normal reproduction of the moving image file from the designated frame. Then, the control unit 108 shifts the processing to step S602 in FIG. 6.

When 1 Dec. in 2008 shown in FIG. 2 is designated as the target period of the highlight reproduction and the instruction for switching to the normal reproduction mode is received during the reproduction for the highlight reproduction period 209, the control unit 108 designates the head frame of the scene 201.

When the highlight reproduction for one day is not designated (NO in step S1011), in step S1013, the control unit 108 determines the highlight reproduction for a plurality of different shooting days, and designates the head frame of the head scene from the scenes on the same shooting day as the current scene being reproduced. In step S1014, the control unit 108 switches the video camera 100 to the normal reproduction mode, starts the normal reproduction of the moving image file from the designated frame. Then, the control unit 108 shifts the processing to step S602 in FIG. 6.

When 1 Dec. in 2008 to 1 Jan. in 2009 in FIG. 2 are designated as the target period of the highlight reproduction and the instruction for switching to the normal reproduction mode is received during the reproduction of the highlight reproduction period 211, the control unit 108 designates the head frame of a scene 203.

According to the present exemplary embodiment, the user easily switches the highlight reproduction to the normal reproduction. When switching the video camera 100 to the highlight reproduction mode, the control unit 108 automatically designates the reproduction start position of the moving image based on the target period of the highlight reproduction to set the normal reproduction from a proper position.

For example, the control unit 108 starts the normal reproduction from any reproduction position of a plurality of predetermined reproduction positions, such as the head frame for the highlight reproduction period or head frame of the scene being reproduced, the head frame of the first scene on the same shooting day as the shooting day of the scene being reproduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-120744 filed May 26, 2010, which is hereby incorporated by reference herein in its entirety.

What is claimed is:

1. An image processing apparatus comprising:
  a reproduction unit configured to reproduce a moving image signal from a recording medium, the reproduction unit having a normal reproduction mode in which the reproduction unit performs normal reproduction of the moving image signal recorded in the recording medium and a highlight reproduction mode in which the reproduction unit reproduces a plurality of highlight reproduction periods in the moving image signal recorded in the recording medium;
  a reception unit configured to receive a switching instruction for switching from the highlight reproduction mode to the normal reproduction mode, the reception unit receiving the switching instruction from a user in the highlight reproduction mode; and
  a control unit configured to switch from the highlight reproduction mode to the normal reproduction mode if the reception unit receives the switching instruction from the user in the highlight reproduction mode,
  wherein the control unit automatically determines, based on a reproduction position of the image signal of when the receiving unit receives the switching instruction in the highlight reproduction mode, as a reproduction start position from which the normal reproduction of the moving image signal is started in the normal reproduction mode to be switched from the highlight reproduction mode, a head position of the highlight reproduction period including the reproduction position of the moving image signal of when the reception unit receives the switching instruction from the user in the highlight reproduction mode.

2. The image processing apparatus according to claim 1, wherein the control unit determines the reproduction start position based on the reproduction position of the moving image signal of when the reception unit receives the switching instruction in the highlight reproduction mode, and identification information for identifying head positions of the plurality of highlight reproduction periods.

3. The image processing apparatus according to claim 1, wherein the control unit determines one of the head position of the highlight reproduction period and a predetermined position which is different from the head position of the highlight reproduction period, as the reproduction start position.

4. The image processing apparatus according to claim 3, wherein the predetermined position includes a head position of a scene of the moving image signal being reproduced when the reception unit receives the switching instruction in the highlight reproduction mode.

5. The image processing apparatus according to claim 3, wherein the predetermined position includes one head position of a plurality of scenes recorded on the same day as a scene being reproduced when the reception unit receives the switching instruction in the highlight reproduction mode.

6. The image processing apparatus according to claim 1, wherein the control unit determines the head position of the highlight reproduction period as the reproduction start position, in a case where the reproduction position of the moving image signal of when the reception unit receives the switching instruction from the user in the highlight reproduction mode is different from the head position of the highlight reproduction period.

7. An image processing apparatus comprising:
  a reproduction unit configured to reproduce a moving image signal from a recording medium, the reproduction unit having a normal reproduction mode in which the reproduction unit performs normal reproduction of the moving image signal recorded in the recording medium and a highlight reproduction mode in which the reproduction unit reproduces a plurality of highlight reproduction periods in the moving image signal recorded in the recording medium;
  a reception unit configured to receive a switching instruction for switching from the highlight reproduction mode to the normal reproduction mode, the reception unit receiving the switching instruction from a user in the highlight reproduction mode; and
  a control unit configured to switch from the highlight reproduction mode to the normal reproduction mode if the reception unit receives the switching instruction from a user in the highlight reproduction mode;

wherein the control unit automatically determines, as a reproduction start position from which the normal reproduction of the moving image signal is started in the normal reproduction mode to be switched from the highlight reproduction mode, one of a plurality of predetermined reproduction positions of the moving image signal in accordance with a reproduction position of the moving image signal of when the receiving unit receives the switching instruction in the highlight reproduction mode.

8. The image processing apparatus according to claim 7, wherein the predetermined reproduction position includes a head position of the highlight reproduction period, and a head position of a scene of the moving image signal being reproduced when the receiving unit receives the switching instruction in the highlight reproduction mode.

9. The image processing apparatus according to claim 7, further comprising:
a designation unit configured to designate a moving image signal to be reproduced in the highlight reproduction mode,
wherein the control unit determines the reproduction start position based on the moving image signal designated by the designation unit and the reproduction position of the moving image signal of when the receiving unit receives the switching instruction in the highlight reproduction mode.

10. An imaging processing method, comprising:
a reproducing step of reproducing a moving image signal from a recording medium, the reproducing step having a normal reproduction mode in which the reproducing step performs normal reproduction of the moving image signal recorded in the recording medium and a highlight reproduction mode in which the reproducing step reproduces a plurality of highlight reproduction periods in the moving image signal recorded in the recording medium;
a receiving step of receiving a switching instruction for switching from the highlight reproduction mode to the normal reproduction mode, the switching instruction being received from a user in the highlight reproduction mode; and
a control step of switching from the highlight reproduction mode to the normal reproduction mode if the switching instruction is received from the user in the highlight reproduction mode;
wherein the control step automatically determines, based on a reproduction position of the moving image signal of when the receiving unit receives the switching instruction in the highlight reproduction mode, as a reproduction start position from which the normal reproduction of the moving image signal is started in the normal reproduction mode to be switched from the highlight reproduction mode, a head position of the highlight reproduction period including the reproduction position of the moving image signal of when the receiving step receives the switching instruction from the user in the highlight reproduction mode.

11. The image processing method according to claim 10, wherein the control step determines the reproduction start position based on the reproduction position of the moving image signal of when the receiving step receives the switching instruction in the highlight reproduction mode, and the identification information for identifying head positions for the plurality of highlight reproduction periods.

12. The image processing method according to claim 10, wherein the control step determines one of the head position of the highlight reproduction period and a predetermined position which is different from the head position of the highlight reproduction period, as the reproduction start position.

13. The image processing method according to claim 12, wherein the predetermined position includes a head position of a scene of the moving image signal being reproduced when the receiving step receives the switching instruction in the highlight reproduction mode.

14. The image processing method according to claim 12, wherein the predetermined position includes one head position of a plurality of scenes recorded on the same day as a scene of when the receiving step receives the switching instruction in the highlight reproduction mode.

15. An image processing method, comprising:
a reproducing step of reproducing a moving image signal from a recording medium, the reproducing step having a normal reproduction mode in which the reproducing step performs normal reproduction of the moving image signal recorded in the recording medium and a highlight reproduction mode in which the reproducing step reproduces a plurality of highlight reproduction periods in the moving image signal recorded in the recording medium;
a receiving step of receiving a switching instruction for switching from the highlight reproduction mode to the normal reproduction mode, the switching instruction being received from a user in the highlight reproduction mode;
a control step of switching from the highlight reproduction mode to the normal reproduction mode if the switching instruction is received from the user in the highlight normal reproduction mode;
wherein the control step automatically determines, as a reproduction start position from which the normal reproduction of the moving image signal is started in the normal reproduction mode to be switched from the highlight reproduction mode, one of a plurality of predetermined reproduction positions in accordance with a reproduction position of the moving image signal of when the switching instruction is received in the highlight reproduction mode.

16. The image processing method according to claim 15, wherein the predetermined reproduction positions include a head position of the highlight reproduction period, and a head position of a scene of the moving image signal being reproduced when the switching instruction is received in the highlight reproduction mode.

17. The image processing method according to claim 15, further comprising:
a designating step of designating a moving image signal to be reproduced in the highlight reproduction mode;
wherein the control step determines the reproduction start position based on the moving image signal designated by the designating step and the reproduction position of the moving image signal of when the switching instruction is received in the highlight reproduction mode.

* * * * *